United States Patent
Tria et al.

(10) Patent No.: US 10,626,313 B2
(45) Date of Patent: Apr. 21, 2020

(54) SOL-GEL MODIFIED PARTICULATES FOR WELLBORE FLUIDS

(71) Applicant: HALLIBURTON ENERGY SERVICES, INC., Houston, TX (US)

(72) Inventors: Maria Celeste Rellamas Tria, Houston, TX (US); Catherine Martin Santos, Houston, TX (US); Cato Russell McDaniel, Montgomery, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 69 days.

(21) Appl. No.: 15/745,182

(22) PCT Filed: Aug. 26, 2015

(86) PCT No.: PCT/US2015/046997
§ 371 (c)(1),
(2) Date: Jan. 16, 2018

(87) PCT Pub. No.: WO2017/034561
PCT Pub. Date: Mar. 2, 2017

(65) Prior Publication Data
US 2018/0208821 A1     Jul. 26, 2018

(51) Int. Cl.
*C09K 8/03*     (2006.01)
*C09K 8/516*     (2006.01)

(52) U.S. Cl.
CPC .............. *C09K 8/032* (2013.01); *C09K 8/03* (2013.01); *C09K 8/516* (2013.01); *C09K 2208/18* (2013.01); *C09K 2208/34* (2013.01)

(58) Field of Classification Search
CPC .......... C09K 8/03; C09K 8/032; C09K 8/516; C09K 17/36; C09K 17/38; Y10S 507/901
See application file for complete search history.

(56) References Cited

U.S. PATENT DOCUMENTS

| | | | |
|---|---|---|---|
| 5,376,629 A | 12/1994 | Smith | |
| 6,287,639 B1 * | 9/2001 | Schmidt | ................ C03C 17/007 427/387 |
| 7,176,165 B2 | 2/2007 | Massam et al. | |
| 7,409,994 B2 | 8/2008 | Massam et al. | |
| 7,651,983 B2 | 1/2010 | Massam et al. | |

(Continued)

OTHER PUBLICATIONS

Doermbach, Karla et al., Silica-Coating of Hematite Nanoparticles Using Reactive Water-Soluble Polyalkoxysiloxanes, Particle & Particle Systems Characterization, 2014, pp. 365-373, vol. 31, No. 3.

(Continued)

*Primary Examiner* — Aiqun Li
(74) *Attorney, Agent, or Firm* — Haynes and Boone, LLP

(57) ABSTRACT

Methods of coating solid particulates used in a wellbore fluid are described. The methods include providing a first solution that includes at least one inorganic sol precursor and at least one solvent, adding an aqueous solution to the first solution to form an inorganic sol that develops into an inorganic sol-gel, applying the inorganic sol-gel to the solid particulates, drying the solid particulates to form an inorganic sol-gel coating on the solid particulates, and mixing the coated solid particulates with a wellbore fluid.

20 Claims, 2 Drawing Sheets

(56) References Cited

U.S. PATENT DOCUMENTS

| | | |
|---|---|---|
| 7,654,983 B2 | 2/2010 | De La Sema et al. |
| 7,786,053 B2 | 8/2010 | Ballard |
| 8,163,677 B2 * | 4/2012 | Endres .................. C08G 77/02 |
| | | 507/233 |
| 8,193,124 B2 | 6/2012 | Mettath et al. |
| 2006/0177661 A1 * | 8/2006 | Smith .................. C04B 18/082 |
| | | 428/403 |
| 2006/0243441 A1 | 11/2006 | Cornelius de Grood et al. |
| 2008/0064613 A1 | 3/2008 | Massam |
| 2009/0159287 A1 | 6/2009 | Tu et al. |
| 2009/0258799 A1 | 10/2009 | Hodder et al. |
| 2013/0220608 A1 | 8/2013 | Rincon-Torres |
| 2014/0087974 A1 | 3/2014 | Villareal et al. |

OTHER PUBLICATIONS

International Search Report and Written Opinion for International Application No. PCT/US2015/046997, dated May 24, 2016. (9 pages).
Tadanaga, K., Kitamuro, K., Matsuda, A. et al., "Formation of superhydrophobic alumina coating films with high transparency on polymer substrates by the sol-gel method," Journal of Sol-Gel Science and Technology (2003), 26, 705-708.

\* cited by examiner

US 10,626,313 B2

SOL-GEL MODIFIED PARTICULATES FOR WELLBORE FLUIDS

CROSS-REFERENCE TO RELATED APPLICATION

The present application is a U.S. National Stage application of International Patent Application No. PCT/US2015/046997, filed on Aug. 26, 2015, the benefit of which is claimed and the disclosure of which is incorporated herein by reference in its entirety.

BACKGROUND

The present invention relates generally to methods of coating solid particulates used in wellbore fluids. In particular, the present invention relates to methods of coating solid particulates used in wellbore fluids using the sol-gel process.

Wellbore fluids contain a variety of solid particulates as weighting agents, loss circulation materials, bridging agents, and lubricating beads. These solid materials have different purposes in the fluid system, but all of them typically need to be modified at some point to improve performance. For instance, weighting agents can be modified to be more compatible with a base fluid, to reduce abrasiveness, or to reduce sedimentation. Loss circulation materials can be treated to prevent disintegration while circulating in the wellbore. Surface treatment of lubricating beads can also be done to reduce their coefficient of friction.

Improving the properties of these solid particulates can be carried out by modifying the surfaces of the particulates through coating. Several methods are known for coating solid particulates, such as using a crosslinkable polymer material to coat the surface, grafting a silanated material, and dry blending with organic dispersants.

In drilling fluids, weighting agents are widely used to control formation pressures, prevent formation caving, and facilitate the pulling of dry pipe. For many years, barite has been the standard weighting agent in the drilling fluid industry. Dwindling supplies and increased consumption of premium barite, however, has led to significant price increases and a reduction in specific gravity in most commercial grades of barite. Other minerals, such as ilmenite and hematite, have been used in the field, but their relatively high hardness can give rise to abrasion/erosion in tubular and surface equipment.

Moreover, weighting agents are commonly added to drilling fluids to give sufficient density to the fluid to hinder inflow of oil or gas into the wellbore from the downhole formation. Sedimentation of weighting agents from the drilling fluids or "sag" is one of the biggest challenges within the drilling fluid industry as it can lead to well control problems, lost circulation, and/or hindered running of casing/liner.

Sag is influenced by a variety of factors related to drilling fluid conditions such as low shear conditions, drill string rotations, drilling fluid formulations and properties, and mass of weighting agents. For drilling fluids utilizing particulate weighting agents, differential sticking or a settling out of the particulate weighting agent is known to occur.

Ilmenite and hematite are two minerals that are used in the field. Their higher density compared to barite, however, impacts both the rheology of the fluids and the settling rate of the weighting material. Because of the mass of the weighting agent, various additives, such as gelling agents and rheology modifiers, are often incorporated to produce rheology that will be sufficient to allow the wellbore fluid to suspend the material without settlement or sag under static and dynamic conditions. The addition of these materials, however, greatly affects fluid viscosity.

Thus, there is a continuing need for improved methods and compositions for coating solid particulates used in wellbore fluids. In particular, there is a need for methods and compositions to reduce abrasiveness and prevent sedimentation of weighting agents.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those skilled in the art and having the benefit of this disclosure.

DETAILED DESCRIPTION

Figure 1:
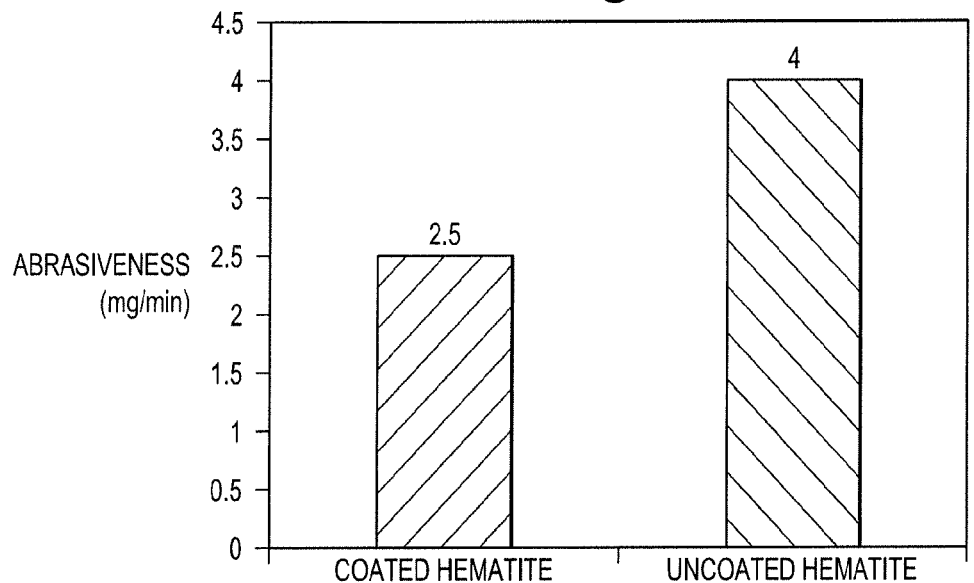
FIG. 1 shows a bar graph of the results of an abrasion test performed on coated solid particulates according to embodiments of the present invention.

According to several exemplary embodiments, methods are provided for coating solid particulates used in wellbore applications. The methods use inorganic sol-gels as the base material for the coating. Organic components can be incorporated in the inorganic sol-gel matrix, producing inorganic-organic composites that provide interesting properties and surface tuning.

According to several exemplary embodiments, methods are provided for reducing abrasiveness of weighting agents by using a sol-gel process to coat the weighting agents. According to several exemplary embodiments, methods are provided for preventing sedimentation of weighting agents by using a sol-gel process to coat the weighting agents.

The term "sol-gel" relates to the formation of inorganic networks through the formation of a colloidal suspension (sol) and gelation of the sol to form a network in a continuous liquid phase (gel). The sol-gel process may be described as the formation of an oxide network through polycondensation reactions of a molecular precursor in a liquid. In this process, the sol (or solution) evolves gradually towards the formation of a gel-like network containing both a liquid phase and a solid phase. Typical precursors of the sol-gel are metal alkoxides and metal chlorides, which undergo hydrolysis and polycondensation reactions to form a colloid.

The most famous version of the sol-gel process is based on the processes of controlled hydrolysis of compounds, usually alkoxides $M(OR)_x$ (M=Si, Ti, Zr, V, Zn, Al, Sn, Ge, Mo, W, etc.) or corresponding chlorides, in an aqueous or organic medium, usually alcohol.

The hydrolysis and polycondensation reactions lead to the formation of a colloidal solution, i.e. sol, of hydroxide particles. Increasing bulk concentration of the dispersed phase or other changes in external conditions (pH, solvent substitution, etc.) leads to the intense formation of contacts between particles and the formation of a monolithic gel, in which the solvent molecules are enclosed in a flexible, but fairly stable, three-dimensional grid formed by particles of hydroxides. Upon curing, the liquid phase of the sol-gel is removed to provide a solid material.

According to several exemplary embodiments, a method for coating solid particulates used in wellbore fluids includes the sol-gel process. A first solution that includes at least one inorganic sol precursor and at least one solvent is provided. The at least one inorganic sol precursor may be a metal oxide (or metal alkoxide), such as aluminum, silicon, titanium, or zirconium oxides (or alkoxides). One or more organic solvents can be used such as ethanol, methanol, isopropanol, n-propanol, n-butanol, 2-ethoxyethanol, tetrahydrofuran, dioxane, formamide, and N,N-dimethylformamide.

Generally, a catalyst for the hydrolysis and/or condensation reactions that ultimately result in the coating layer can be included into the solution. The catalyst can be an acid, a base, or a complexing agent that interacts with the oxygen, metal atom, a carbon bound to the oxygen of the sol precursor, or the oxygen, metal atom, or hydrogen of the hydrolysis product of the sol precursor such that one or more of the reactions that result in the formation of the coating is catalyzed.

Next, a solution including water (e.g., water, or an acid or base solution) is added to the first solution to form the inorganic sol that develops into an inorganic sol-gel. The water can be generally added at any rate and at any temperature. In general, the water is added slowly.

The inorganic sol-gel is then applied to the solid particulates, and the solid particulates are cured/dried to form an inorganic sol-gel coating on the solid particulates. The coated solid particulates can then be mixed with a wellbore fluid.

According to several exemplary embodiments, the inorganic sol-gel can be used to coat solid particulates using the steps described below. In a specified volume of the prepared sol precursor, a specified amount of the solid particulate may be added and mixed for a couple of second to minutes. The resulting suspension may then be filtered via vacuum filtration or gravity filtration, and the coated solid residue collected. The filtrate can be recollected and can be reused for coating another batch of solid particulates. The coated solid is then dried in an oven at a specified temperature (e.g., 100-400° C.). The drying temperature depends on the application. For example, higher temperatures can be used to obtain harder coatings and lower temperatures can be used for simply just drying off the alcohol solvent.

Advantageously, the coating thickness can be easily controlled based on the concentration of the sol precursor and/or the amount of time the solid particulates are in contact with the inorganic sol-gel. The sol precursor can be easily diluted with the solvent to adjust the concentration.

According to several exemplary embodiments, organic components can be added to the inorganic sol-gel depending on the property that needs to be incorporated into the coating. The inorganic sol-gel can be chemically modified by incorporating organic components in the inorganic sol-gel matrix, producing inorganic-organic composites that provide other properties and surface tuning. The organic components are any suitable compounds that will react with the hydroxyl group in the sol-gel (e.g., compounds having ester and/or ether functionalities), and in several exemplary embodiments, form a covalent bond with the hydroxide groups of the inorganic sol-gel. The organic components can react with the inorganic sol-gel to form a new material with different properties.

Advantageously, the methods and compositions described herein allow for the readily tailoring of the chemical properties of the coating depending on a desired application. By reacting the inorganic sol-gel with organic compounds, it is possible to convert the coating from hydrophilic to lipophilic. For example, to render the coating oil-wetting or hydrophobic, the inorganic sol-gel can be reacted with an organic polymer having hydrophobic groups. If the desired coating is water-wetting or hydrophilic, an organic polymer having hydrophilic groups can be selected. Thus, the chemical properties of the coating can be tuned or adjusted by chemical reaction of the inorganic sol-gel.

According to several exemplary embodiments, organosilanes are incorporated into the inorganic sol-gel matrix and form covalent bonds with the sol-gel. Suitable organosilane compounds include, but are not limited to, 3-glycidoxypropyltrimethoxysilane (GTMS). Other suitable organosilanes for making the sol-gel coating include, but are not limited to, tetraethylorthosilicate, 3-aminopropyltriethoxysilane, 3-glycidoxy-propyltriethoxysilane, p-aminophenylsilane, p or m-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltrimethoxysilane, 2-(3,4-epoxycyclohexyl)ethyltriethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, vinyltrimethoxysilane and combinations thereof.

According to several exemplary embodiments, polymeric organic binders can be added to the inorganic sol-gel matrix. Examples of suitable polymeric organic binders include, but are not limited to, polyacrylates, cellulose acetate butyrate, polyvinyl alcohol, polyethylene glycols, polyvinylpyrrolidone, polyethylene oxide, carboxymethylcellulose, methylcellulose, and combinations thereof.

Advantageously, the methods for coating surfaces of solid particulates described herein are simple and quick and use relatively inexpensive starting materials. The inorganic sol-gel formulations can be reused and tuned for different applications. The methods provide versatility in incorporating organic components, and the sol-gel readily coats solid particulates by simply drying on the surface of the particulates. The coatings form a stable network when dried and are applicable to all types of solid surfaces.

Solid particulates that may be coated using the sol-gel process described herein include weighting agents, loss circulation materials, bridging agents, and lubricating beads. For example, the solid particulates may include for example, barium sulfate (barite), calcium carbonate, dolomite, ilmenite, hematite, olivine, siderite, manganese oxide, iron oxide, strontium sulfate, and combinations thereof, as well as any other suitable materials that are known to one of ordinary skill in the art. These solid materials may be used, for example, as weighting agents in a wellbore fluid. The weighting agents used may include a variety of compounds well known to one of skill in the art.

The coated solid particulates described herein may be used in any wellbore fluid such as drilling, cementing, completion, packing, work-over (repairing), stimulation, well killing, spacer fluids, and other uses of high density fluids. According to several exemplary embodiments, solid particulates that have been coated using the sol-gel process disclosed herein may be included as an additive in a wellbore fluid. The wellbore fluids may include an oleaginous phase or a non-oleaginous phase. One of ordinary skill in the art recognizes that functionalization of the coating may depend upon the fluid phase of the wellbore fluid, in which the coated solid particulates are incorporated. For example, if the coated solid particulates are to be incorporated in an oil-based or oleaginous fluid, the functional groups may include grease chains or fatty acids to increase the lipophilicity of the coated solid particulates and/or allow the coated solid particulates to behave as a surfactant, which may allow for additional surfactants present in an oil-based wellbore fluid to be reduced or eliminated. The wellbore fluid may be a water-based fluid, an invert emulsion or an oil-based fluid.

Water-based wellbore fluids may have an aqueous fluid as the base solvent. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, fonnates, nitrates, oxides, and fluorides. Salts that may be incorporated in a given brine include any one or more of those present in natural seawater or any other organic or inorganic dissolved salts. Additionally, brines that may be used may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oil-based/invert emulsion wellbore fluids may include an oleaginous continuous phase and a non-oleaginous discontinuous phase. The oleaginous fluid may be a liquid and may be a natural or synthetic oil. In one embodiment, the oleaginous fluid is selected from the group including diesel oil, mineral oil, a synthetic oil, such as hydrogenated and unhydrogenated olefins including poly(alpha-olefins), linear and branch olefins and the like, polydiorganosiloxanes, sitoxanes, or organosiloxanes, esters of fatty acids, specifically straight chain, branched and cyclical alkyl ethers of fatty acids, mixtures thereof and similar compounds known to one of skill in the art, and mixtures thereof.

The non-oleaginous fluid used in the formulation of the invert emulsion fluid is a liquid and may be an aqueous liquid. In one embodiment, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion.

The wellbore fluids are especially useful in the drilling, completion and working over of subterranean oil and gas wells. In particular the wellbore fluids may find use in formulating drilling muds and completion fluids.

Conventional methods can be used to prepare the wellbore fluids disclosed herein. In one embodiment, a desired quantity of water-based fluid and a suitable amount of the coated solid particulates are mixed together and the remaining components of the wellbore fluid are added sequentially with continuous mixing. In another embodiment, a desired quantity of oleaginous fluid such as a base oil, a non-oleaginous fluid and a suitable amount of the coated solid particulates are mixed together and the remaining components are added sequentially with continuous mixing. An invert emulsion may be formed by vigorously agitating, mixing or shearing the oleaginous fluid and the non-oleaginous fluid.

Other additives that may be included in the wellbore fluids include for example, wetting agents, organophilic clays, viscosifiers, fluid loss control agents, surfactants, dispersants, interfacial tension reducers, pH buffers, mutual solvents, thinners, thinning agents and cleaning agents. The addition of such agents is well known to one of ordinary skill in the art of formulating drilling fluids and muds.

The properties of the wellbore fluids may allow for the wellbore fluid to meet the requirements of low sag during drilling, including horizontal drilling, and low settling of drilled solids and weighting agents when the wellbore fluid is static. The wellbore fluids also provide for decreased abrasiveness when drilling.

Reduced Abrasion

Abrasiveness may be defined as the property of a material to remove matter from another surface by friction. Weighted wellbore fluids are abrasive in nature due to the weighting agents suspended therein. As these wellbore fluids are pumped through the drilling assembly, the weighting agents scour and abrade all surfaces with which they come in contact. The drill solids suspended in the fluids also abrade all surfaces with which they come in contact. These surfaces include, for example, the drill pipes, downhole tools, and pumps. This continuous abrasion by the circulating fluid causes erosive wear of the drill assembly. This wear may result in failure of the drill bit, or other parts of the drill assembly. Drilling activity may be halted to replace the worn parts. This downtime may prove expensive, both in terms of lost time and lost productivity. Reducing the abrasive wear of downhole tools may reduce downtime for repair. This would prolong the time spent drilling and therefore increase the efficiency and cost-effectiveness of the drilling operation.

The incorporation of coatings on the surface of weighting agents is one way of addressing abrasiveness. According to several exemplary embodiments, methods of reducing abrasiveness of weighting agents are provided. The methods include coating the weighting agents using a sol-gel process as described herein. The coated weighted agents can then be added to a wellbore fluid, and introduced into a subterranean formation.

The wellbore fluid containing the coated weighting agent exhibits a reduced abrasiveness compared to the wellbore fluid containing the uncoated weighting agent. That is, a wellbore fluid containing weighting agent A that is coated using the sol-gel process has a reduced abrasiveness compared to a wellbore fluid containing uncoated weighting agent A. According to several exemplary embodiments, the coated weighting agents exhibit a reduced abrasiveness of 40% or more compared to the same weighting agents that are uncoated. The coated weighting agents can reduce the non-production time (NPT) significantly by preventing erosion of drilling equipment such as pumps, drill pipe, and drill bits during the drilling operation.

According to several exemplary embodiments, any type of weighting agents may be coated in the manner described herein to prevent abrasion. The coated weighting agents are easily dispersible and stable.

Reduced Sedimentation

One demand on a typical particulate weighting agent is that it should form a stable suspension that does not readily settle out or sag. Secondarily, the suspension should exhibit a low viscosity to facilitate pumping and minimize the generation of high pressures.

Sag is the settling of particulate weighting agents that can occur when a treatment fluid is static or being circulated. Sag is particularly problematic when it occurs to a static fluid in the annulus of a wellbore. If settling is prolonged, the upper part of a wellbore may lose mud density, which lessens the hydrostatic pressure in the hole, potentially causing an influx of formation fluid into the well. While sub-micron particulate weighting agents may serve to prevent sag, other issues with their use arise related to increased plastic viscosity and transferability properties.

The incorporation of coatings on the surface of weighting agents is one way of addressing sag. According to several exemplary embodiments, methods of reducing sedimentation of weighting agents in a wellbore fluid are provided. The methods include coating the weighting agents using a sol-gel process as described herein. The coated weighted agents can then be added to a wellbore fluid, and introduced into a subterranean formation. The wellbore fluid containing the coated weighted agent exhibits a reduced sedimentation compared to the wellbore fluid with the uncoated weighting agent.

Moreover, the coated weighting agents do not have a significant effect on the fluid properties of the wellbore fluid. That is, the coated weighting agents do not adversely affect the viscosity the wellbore fluid.

The following examples are illustrative of the compositions and methods discussed above and are not intended to be limiting.

Example 1

Coating Hematite Particles for Reduced Abrasion and Sag

An alumina sol precursor was prepared by the following method. Two mL of aluminum sec-butoxide (Al(O-sec-Bu)$_3$) was mixed with 10 mL of isopropanol for an hour at room temperature. One mL of ethyl acetoacetate was added to the mixture and stirred for another three hours at room temperature. Water in isopropanol (0.56 mL in 1 mL) was added to the mixture and stirred for another hour. The resulting sol was then diluted to 50% of its volume with isopropanol and a sol-gel developed. The prepared sol-gel was stable and did not gel out for months.

The prepared sol-gel was then used to coat a hematite weighting agent. In a glass container, a specified amount of hematite was added, followed by adding just enough volume of the sol-gel to wet the materials. The mixture was mixed for a couple of seconds using a spatula until all the particles were wetted with the sol-gel. The remaining sol-gel was decanted, and then the coated hematite was air dried or placed in an oven at a specified temperature.

To test the effectiveness of the alumina coated hematite in preventing abrasion, a standard API abrasion test was performed. The test measures weight loss of a specially shaped and coated stainless steel mixer blade after 20 minutes at 11,000 rpm running in a laboratory prepared fluid sample containing bentonite. Abrasiveness is quantified by the rate of weight loss, reported in mg/min.

Table I presents the abrasion test results obtained for the coated and uncoated hematite. FIG. 1 illustrates the results in a bar graph. Clearly, the coated hematite produced a reduced abrasiveness of about 40% compared to the uncoated hematite. In addition, the coated hematite showed an improved dispersion in base various oils compared to the uncoated hematite.

TABLE I

Abrasion Test Results for Hematite Coated Particles

| | Uncoated Hematite | Coated Hematite |
|---|---|---|
| Mass of Impeller before testing (mg) | 12342.6 | 12344.4 |
| Mass of impeller after testing (mg) | 12264.5 | 12294.5 |
| Time of testing (min) | 20 | 20 |
| Abrasion (mg/min) | 4.0 | 2.5 |

Figure 2:
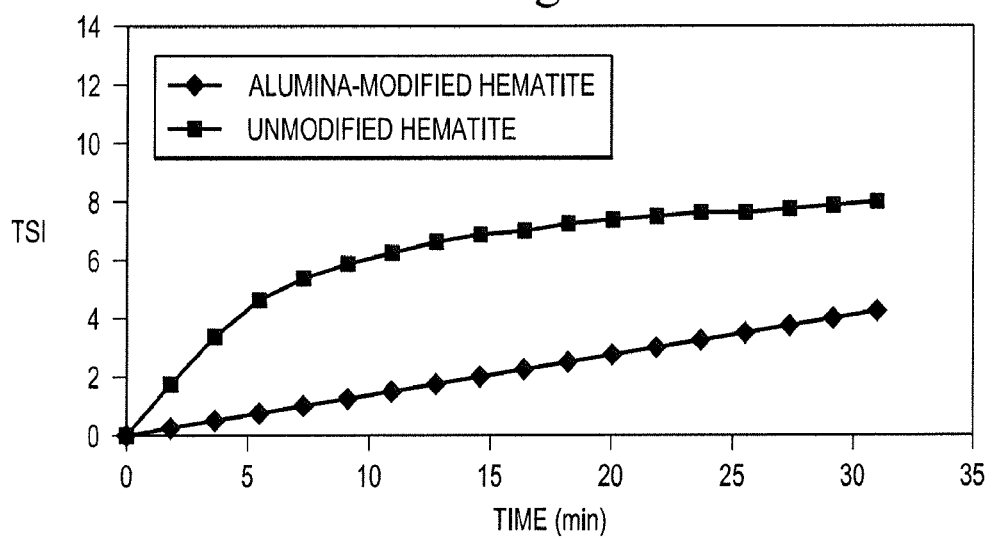
FIG. 2 shows the turbiscan plot of coated solid particulates in SARALINE 185 base oil according to embodiments of the present invention.
Figure 3:
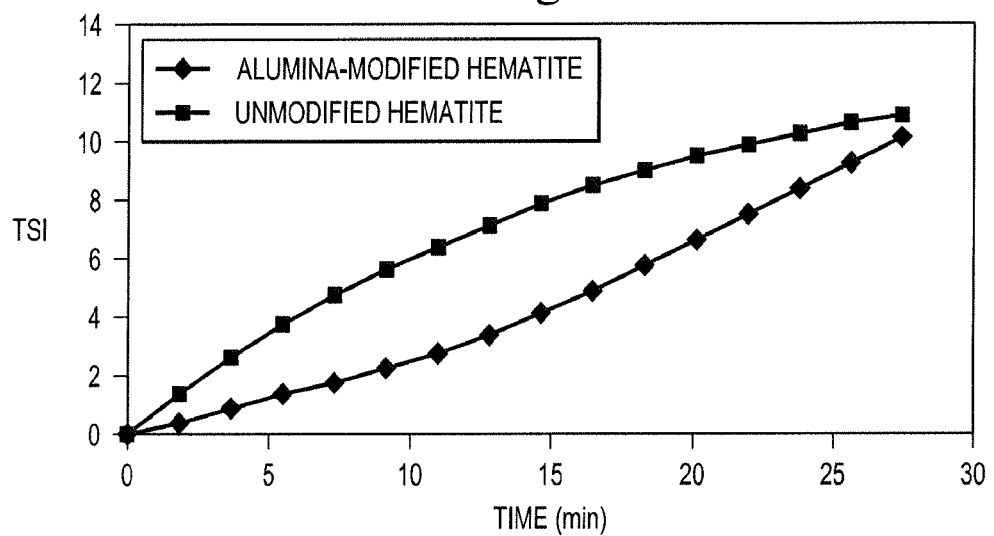
FIG. 3 shows the turbiscan plot of coated solid particulates in ESCAID 110 base oil according to embodiments of the present invention.
Figure 4:
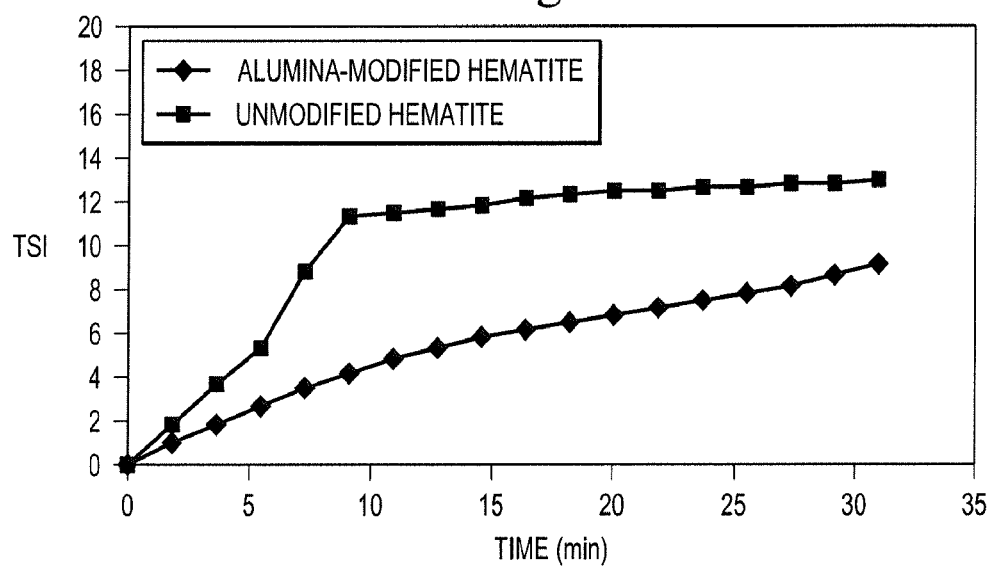
FIG. 4 shows the turbiscan plot of coated solid particulates in XP 07™ base fluid according to embodiments of the present invention.

To test the effectiveness of the alumina-coated hematite in preventing sedimentation, a turbiscan of an unmodified hematite and alumina-modified hematite in various base oils (SARALINE 185, ESCAID 110, and XP 07™ base oils) were acquired. Specifically, 3.5 g of the coated and uncoated hematite were exposed to 30 mL of base oil for 30 minutes. To delay the sedimentation of the coated and uncoated hematite prior to data acquisition, a drop of RM-63™ rheology modifier was added to each mixture. FIGS. 2-4 show the turbiscan plots of the mixtures in different base oils.

It is evident that the modified hematite showed a significantly lower sedimentation rate than the unmodified hematite. In all the base oils tested, the uncoated hematite settled faster than the alumina coated hematite. In SARALINE 185 base oil, the coated hematite showed 50% less sedimentation than the uncoated hematite after the 30 minute test. In ESCAID 110 base oil, the coated hematite showed 40% less sedimentation that the uncoated hematite after the first 15 minutes of the test. In XP 07™ base oil, the coated hematite showed 25% less sedimentation than the uncoated hematite after the 30 minute test.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of treating a subterranean formation comprising:
   providing a first solution that includes at least one inorganic sol precursor and at least one solvent;
   adding an aqueous solution to the first solution to form an inorganic sol that develops into an inorganic sol-gel;
   applying the inorganic sol-gel to solid particulates;
   drying the solid particulates to form an inorganic sol-gel coating on the solid particulates;
   mixing the coated solid particulates with a drilling fluid; and
   circulating the drilling fluid through a wellbore as the wellbore is being drilled.

2. The method of claim 1, wherein the at least one inorganic sol precursor comprises an aluminum, silicon, titanium, or zirconium alkoxide.

3. The method of claim 1, wherein the at least one solvent comprises an alcohol.

4. The method of claim 1, further comprising adjusting a hardness of the inorganic sol-gel coating by changing a drying temperature.

5. The method of claim 1, further comprising adjusting a thickness of the inorganic sol-gel coating by changing a concentration of the inorganic sol precursor in the first solution, a time the solid particulates are in contact with the first solution, or both.

6. The method of claim 1, further comprising chemically modifying the inorganic sol-gel by adding an organic component to the inorganic sol-gel.

7. The method of claim 6, wherein the organic component comprises one or more of an organosilane and polymeric organic binder.

8. The method of claim 1, wherein the solid particulates comprise one or more weighting agents selected from barium sulfate, calcium carbonate, dolomite, ilmenite, hematite, olivine, siderite, manganese oxide, iron oxide, and strontium sulfate.

9. A method of treating a subterranean formation comprising:
providing a first solution that includes at least one inorganic sol precursor and at least one solvent;
adding an aqueous solution to the first solution to form an inorganic sol that develops into an inorganic sol-gel;
applying the inorganic sol-gel to a plurality of weighting agents;
drying the weighting agents to form an inorganic sol-gel coating on the weighting agents;
mixing the coated weighting agents with a drilling fluid; and
circulating the drilling fluid through a wellbore as the wellbore is being drilled.

10. The method of claim 9, wherein the weighting agents comprise one or more of barium sulfate, calcium carbonate, dolomite, ilmenite, hematite, olivine, siderite, manganese oxide, iron oxide, and strontium sulfate.

11. The method of claim 9, wherein the at least one inorganic sol precursor comprises an aluminum, silicon, titanium, or zirconium alkoxide.

12. The method of claim 9, further comprising adjusting a hardness of the inorganic sol-gel coating by changing a drying temperature.

13. The method of claim 9, further comprising adjusting a thickness of the inorganic sol-gel coating by changing a concentration of the inorganic sol precursor in the first solution, a time the weighting agent is in contact with the first solution, or both.

14. The method of claim 9, further comprising chemically modifying the inorganic sol-gel by adding an organic component to the inorganic sol-gel.

15. The method of claim 9, wherein the coated weighting agents exhibit a reduced abrasiveness compared to the weighting agents without a coating.

16. The method of claim 15, wherein the coated weighting agents exhibit a reduced abrasiveness of about 40% or more compared to the weighting agents without a coating.

17. The method of claim 9, wherein the coated weighting agents exhibit a lower sedimentation rate compared to the weighting agents without a coating.

18. A method of treating a subterranean formation comprising:
providing a first solution that includes a metal alkoxide and an alcohol;
adding water to the first solution to form an inorganic sol that develops into an inorganic sol-gel;
applying the inorganic sol-gel to a plurality of weighting agents;
drying the weighting agents to form an inorganic sol-gel coating on the weighting agents;
mixing the coated weighting agents with a drilling fluid; and
circulating the drilling fluid through a wellbore as the wellbore is being drilled.

19. The method of claim 18, wherein the metal alkoxide comprises an aluminum, silicon, titanium, or zirconium alkoxide.

20. The method of claim 18, further comprising adjusting a hardness of the inorganic sol-gel coating by changing a drying temperature.

* * * * *